Figure 1:
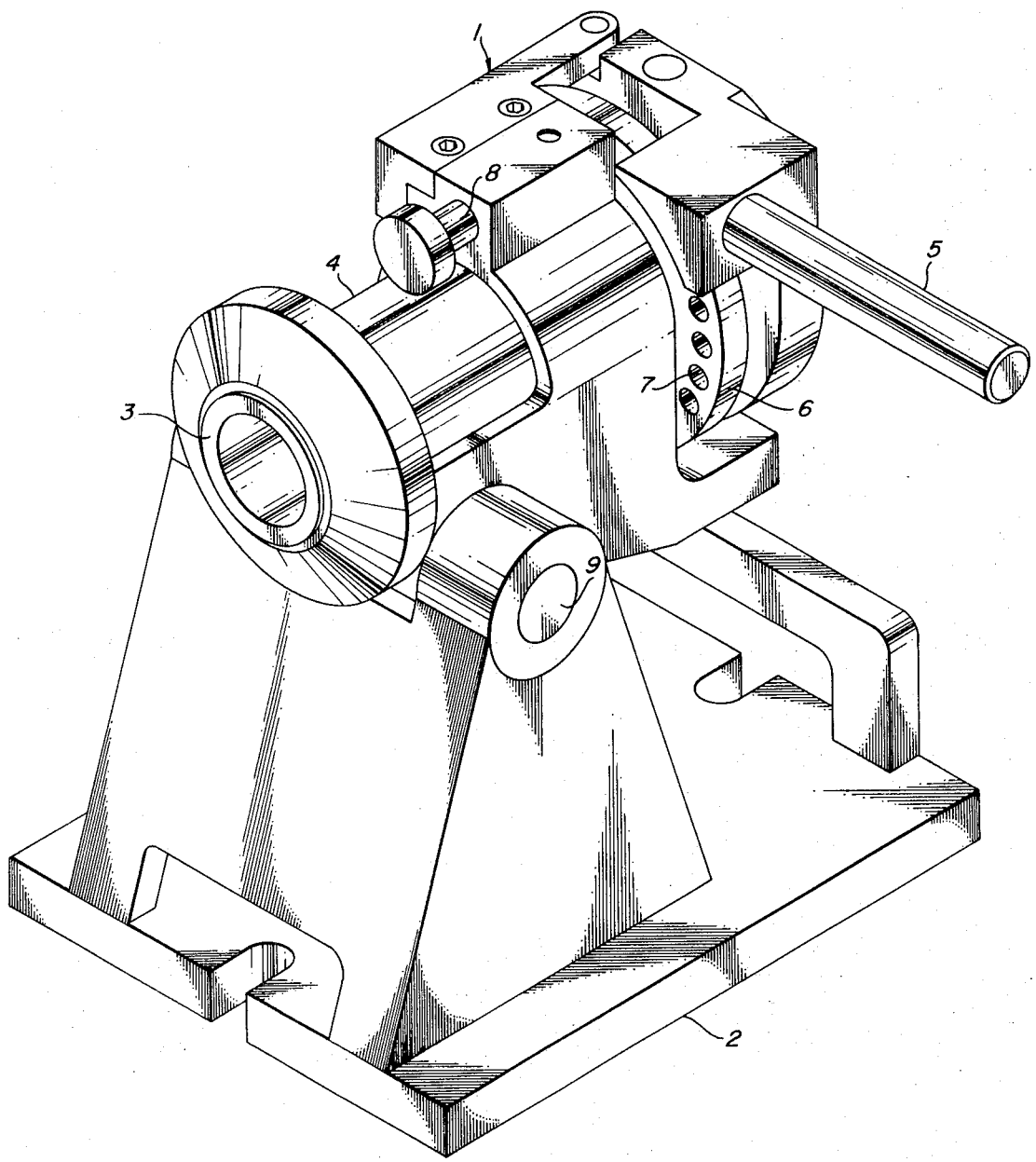

United States Patent [19]
Coope

[11] 3,844,666
[45] Oct. 29, 1974

[54] APPARATUS FOR SECURING A WHEEL ONTO A SHAFT OR THE LIKE

[75] Inventor: Robert L. Coope, Phoenix, Ariz.

[73] Assignee: Stevens Engineering, Incorporated, Phoenix, Ariz.

[22] Filed: Sept. 8, 1970

[21] Appl. No.: 70,109

[52] U.S. Cl. ............................... 403/355, 403/337
[51] Int. Cl. ............................................. F16d 1/06
[58] Field of Search ..... 287/53 R, 53 TK, 129, 130; 74/548, 813; 64/10; 279/5; 269/69

[56] References Cited
UNITED STATES PATENTS

| | | | |
|---|---|---|---|
| 2,641,910 | 6/1953 | Riopelle et al...................... | 64/10 X |
| 2,689,739 | 9/1954 | May......................................... | 279/5 |
| 3,403,571 | 10/1968 | Sheckells........................ | 287/53 R X |

FOREIGN PATENTS OR APPLICATIONS

| | | | |
|---|---|---|---|
| 1,301,601 | 7/1962 | France................................ | 287/129 |
| 1,149,201 | 5/1963 | Germany............................. | 287/129 |

*Primary Examiner*—Andrew V. Kundrat
*Attorney, Agent, or Firm*—Cahill, Sutton & Thomas

[57] ABSTRACT

In order to removably secure a wheel onto a spindle in a manner assuring that the wheel is held firmly with no possibility of circumferential movement relative to the spindle and without unduly distorting the spindle, the wheel is provided with three radially inwardly projecting dowel pins oriented 120° apart. The inside diameter of the wheel is a close fit to the outside diameter of the spindle to eliminate frontal or lateral movement in the assembly. The end of the spindle is provided with three semi-circular indentations disposed 120° apart to meet with the three dowel pins as the wheel is slid into position on the spindle. The radius of the indentations is the same or very slightly smaller than the radius of the pins with which they engage to insure that no circumferential play will be evident in the assembly. In the disclosed embodiment, the wheel is fixed in position by means of a plurality of screws which pass axially through the wheel and thread into a nut plate which is, in turn, threaded onto the spindle. Hence, tightening the screws draws the dowel pins into the semi-circular indentations to register the wheel at three separate rest surfaces on the end of the spindle.

2 Claims, 2 Drawing Figures

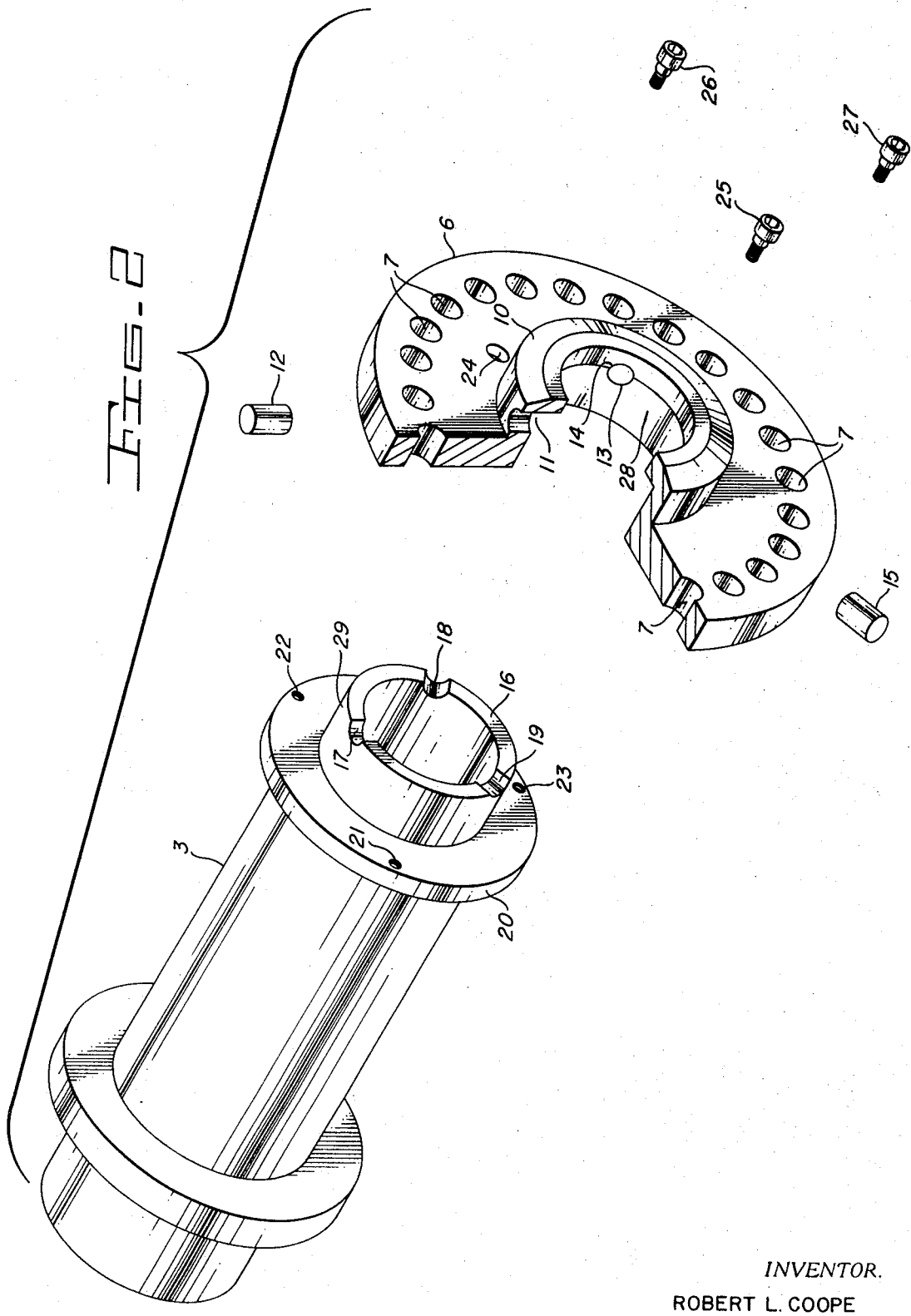

APPARATUS FOR SECURING A WHEEL ONTO A SHAFT OR THE LIKE

This invention relates to the machine tool arts and, more particularly, to means for securing a wheel, such as an index wheel, to a spindle. In a broader sense, the invention relates to means for very accurately securing a wheel-like structure to a shaft or the like.

Modern requirements to machine to very close tolerances have placed commensurately rigid requirements on the accuracy of machine tools. Several varieties of machine tools incorporate exchangable index wheels which, ideally, are replaced with no appreciable loss of accuracy in the assembly. Thus, radial and circumferential play must be minimized to the furthest extent possible, and concentricity of the assembly must be preserved. Further, the desired accuracy must be maintainable through extended use which would be expected to bring about a certain amount of wear.

The prior art methods of securing an index wheel to a spindle are numerous and diverse. Spline arrangements, the utilization of counter sunk apertures in the index wheel for receiving correspondingly shaped screws, and threaded members disposed on either side of the index wheel to lock the index wheel into position are a few of the prior art methods, all of which suffer more or less from lack of accuracy and/or a tendency to become more inaccurate through normal use.

It is therefore a broad object of this invention to provide improved method and apparatus for securing a wheel onto a shaft or the like.

It is another object of this invention to provide such method and apparatus in which the concentricity of the wheel with respect to the shaft is very closely maintained and in which circumferential and radial play is virtually eliminated.

It is yet another object of this invention to provide method and apparatus for accurately securing a wheel onto a shaft or the like in which wear and the effects of wear on accuracy are minimized.

Briefly, in accordance with a presently preferred embodiment of the invention, these objects are achieved by providing an index wheel with three radially inwardly projecting dowel pins oriented 120° apart. Correspondingly, the end of the shaft or spindle to which the wheel is to be secured is provided with three indentations disposed 120° apart to receive the three dowel pins as the wheel and shaft are mated. The radii of the dowel pins and the indentations are closely coordinated to achieve essentially zero circumferential play, and the inside diameter of the wheel is a close fit to the outside diameter of the spindle to minimize radial movement.

The subject matter of the invention is particularly pointed out and distinctly claimed in the concluding portion of the specification. The invention, however, both as to organization and method of operation, may best be understood by reference to the following description taken in connection with the accompanying drawing of which:

FIG. 1 is a perspective view of a spindle housing machine tool apparatus incorporating the present invention; and FIG. 2 is an exploded view of an index wheel and a spindle to which it is to be accurately secured in accordance with the present invention.

Referring now to FIG. 1, a typical assembly in which the present invention may be advantageously presented consists generally of a machine tool spindle housing 1 pivotally supported on a base member 2. The spindle housing 1 includes a spindle 3 for holding a conventional machine tool collet. The spindle 3 is journalled within the frame 4 of the spindle housing 1 and extends rearwardly for coupling with a quick release mechanism (not shown) activated by a lever 5. An index wheel 7 is concentrically fixed to the spindle 3 and is provided with circumferentially disposed apertures 7 which may be rotated into engagement with a spring loaded indexing plunger 8 to fix the angular position of the spindle 3 in order to carry out a predetermined machining operation. The spindle housing 1 may be pivoted about an axis 9 on the base 2 in order to adjust the angular inclination of the spindle 3. The vertical position is secured by locking means disposed opposite the view presented and therefore not shown in FIG. 1.

Attention is now directed to FIG. 2 which depicts that part of the internal structure of the spindle housing 1 of FIG. 1 which is germane to the instant invention. It will be observed in FIG. 2 that the index wheel 6 is provided with a hub portion 10 extending rearwardly away from the spindle 3. The hub portion 10 of the index wheel 6 has three identical radially directed apertures disposed 120° apart. As shown in the cutaway portion of the index wheel 6 in FIG. 2, a first radially directed aperture 11 receives an accurately dimensioned dowel pin 12. Similarly, a second dowel pin 13 is depicted in place in a second radially directed aperture 14; and a third dowel pin 15 is fitted to a third radially directed aperture not in view in FIG. 2.

Still referring to FIG. 2, the rearward terminus 16 of the spindle 3 is provided with three semicircular indentations, 17, 18, and 19, which are also disposed 120° apart. The radii of the indentations 17, 18, and 19 are equal to one another and are made the same or very slightly smaller than the radii of the dowel pins 12, 13, and 15 which are also each of the same radius.

A nut plate 20 is threaded onto the spindle 3 and has three threaded apertures 21, 22, and 23 which are disposed near its periphery and extend longitudinally through the nut plate. The axes of the threaded apertures 21, 22, and 23 are parallel to the spindle axis. The index wheel 6 is provided with three positionally corresponding, unthreaded apertures, one of which falls in the cutaway portion of the index wheel 6 as it is pictured in FIG. 2. The second aperture is out of view in FIG. 2 and a third aperture 24 is aligned with the threaded aperture 22 of the nut plate 20. Three screws 25, 26, and 27 have threaded portions for engagement with the threaded apertures 21, 22, and 23 of the nut plate 20 and unthreaded shoulder portions with pass through the corresponding apertures, including the aperture 24, in the index wheel 6.

With the dowel pins 12, 13, and 15 press fit into their respective radially extending apertures in the hub portion 10 of the index wheel 6, index wheel 6 is introduced over the end 16 of the spindle 3. The inner surface 28 of the hub portion 10 has an inside diameter which very closely fits the outer surface 29 of the spindle 3 between the nut plate 20 and the end 16 of the spindle. The wheel is slid onto the spindle until the dowel pins 12, 13, and 15 engage the semicircular indentations 17, 18, and 19. The index wheel 6 is then fastened into position by means of the three screws 25, 26, and 27 passing through the apertures in the index wheel 6 which are in alignment with the threaded apertures 21, 22, and 23 of the nut plate 20. Tightening of the three screws 25, 26, and 27 draws the dowel pins 12, 13, and 15 into the semicircular indentations 17, 18, and 19 on the end 16 of the spindle 3 thus fixing the axial location of the wheel 6 on three separate rest surfaces.

By insuring that the radial center lines of the three semicircular indentations 17, 18 and 19 on the spindle 3 are in a common plane perpendicular to the center line of the spindle and that the radial center lines of the three dowel pins 12, 13, and 15 on the index wheel 6 are likewise on a common plane perpendicular to the center line of the wheel, the plane of rotation of the wheel is of necessity perpendicular to the center line of the spindle when the two parts are assembled. By making the radii of the semicircular indentations the same or slightly smaller than the radii of the dowel pins in the wheel, circumferential movement of the wheel relative to the spindle is precluded when they are assembled. Further, the three point registration of the wheel on the spindle circumvents the problem of redundancy in points of contact and the consequent problem of distortion which results from efforts to assemble uneven surfaces together. One of the most significant advantages accruing to the wheel attachment method of the present invention is the elimination of circumferential movement of the index wheel relative to the spindle thereby assuring very accurate angular adjustment of a collet-held work piece.

While the principles of the invention have now been made clear in an illustrative embodiment, there will be immediately obvious to those skilled in the art many modifications of structure, arrangement, proporations, the elements, materials, and components, used in the practice of the invention which are particularly adapted to specific environments and operating requirements without departing from those principles.

I claim:

1. An assembly comprising:
a. a spindle having its outer surface threaded along at least a portion of its length, said spindle having an end provided with a plurality of radially extending depressions of equal arcuate cross-section, adjacent ones of said depressions being equally angularly spaced from one another, the axes of said depressions falling into a single plane to which the axis of said spindle is perpendicular;

b. a wheel, said wheel having a concentric axial bore of an inner diameter slightly larger than the outer diameter of said spindle such that said wheel may be slipped onto said spindle with a predetermined maximum of radial play therebetween, said wheel being provided with a plurality of dowel pins extending radially inwardly into said bore, said plurality of dowel pins corresponding in number and angular disposition to said plurality of depressions and having equal radii at least as large as the radii of curvature of said plurality of depressions, the axes of said dowel pins falling into a single plane to which the axis of said wheel is perpendicular; and c. a nut plate having a concentric axial bore threaded and dimensioned for threaded engagement with said spindle and a plurality of bolt receiving, threaded axial bores disposed radially outwardly from and equally circumferentially spaced about said concentric axial bore through said nut plate; such that said dowel pins seat into said depressions to prevent relative circumferential movement between said spindle and said wheel;

d. said wheel being provided with a plurality of apertures disposed for axial alignment with said bolt receiving threaded bores in said nut plate when said nut plate is threaded onto and said wheel is slipped onto said spindle; and e. a plurality of bolts extending through said apertures and threaded into said bolt receiving bores.

2. The assembly of claim 1 in which said plurality of depressions comprises three depressions.

* * * * *